(12) United States Patent　　(10) Patent No.: US 9,046,730 B2
Li et al.　　(45) Date of Patent: Jun. 2, 2015

(54) DISPLAYS AND SENSORS INTEGRATED WITH MULTI-STATE CHOLESTERIC LIQUID CRYSTAL DEVICES

(75) Inventors: Le Li, Hopewell Junction, NY (US); Yongxin Tang, Poughkeepsie, NY (US); Haiping Yu, Hopewell Junction, NY (US); Jie Yang, Fishkill, NY (US); Jiangbin Zhao, Fishkill, NY (US)

(73) Assignee: Kent Optronics, Inc., Hopewell Junction, NY (US)

( * ) Notice: Subject to any disclaimer, the term of this patent is extended or adjusted under 35 U.S.C. 154(b) by 368 days.

(21) Appl. No.: 13/453,655

(22) Filed: Apr. 23, 2012

(65) Prior Publication Data

US 2012/0293733 A1　　Nov. 22, 2012

Related U.S. Application Data

(60) Provisional application No. 61/517,550, filed on Apr. 21, 2011.

(51) Int. Cl.
　　*G02F 1/137*　　(2006.01)
(52) U.S. Cl.
　　CPC .................................. *G02F 1/13718* (2013.01)

(58) Field of Classification Search
　　None
　　See application file for complete search history.

(56) References Cited

U.S. PATENT DOCUMENTS

| | | | |
|---|---|---|---|
| 5,877,826 A * | 3/1999 | Yang et al. | 349/36 |
| 6,204,904 B1 * | 3/2001 | Tillin et al. | 349/119 |
| 6,674,504 B1 * | 1/2004 | Li et al. | 349/169 |
| 8,044,784 B2 * | 10/2011 | Ghannam et al. | 340/449 |
| 2009/0213282 A1 * | 8/2009 | Burlingame et al. | 349/13 |

* cited by examiner

*Primary Examiner* — Richard Kim
(74) *Attorney, Agent, or Firm* — Reising Ethington P.C.

(57) ABSTRACT

A sensing device may include a cholesteric crystal device including two optically transparent substrates; a liquid crystal having portions adapted for producing a plurality of optical states, said liquid crystal being arranged between the two optically transparent substrates; an optical sensor for changing optical states of respective portions of said liquid crystal to produce a range of respective optical states including all optical states produced by said liquid crystal ranging from one state to any combination of broadband reflection, tunable narrow band reflection, light scattering, and transparency in accordance with an amount of voltage applied across said cholesteric crystal device for changing optical states.

12 Claims, 8 Drawing Sheets

DISPLAYS AND SENSORS INTEGRATED WITH MULTI-STATE CHOLESTERIC LIQUID CRYSTAL DEVICES

PRIORITY

The present invention claims priority under 35 USC section 119 and based upon a provisional application (application No. 61/517,550) which was filed on Apr. 21, 2011, which is the continuation of and claims any available priority from U.S. Pat. No. 6,674,504 (Incorporated by reference in its entirety), filed Oct. 1, 2001.

FIELD OF THE INVENTION

This invention relates to Displays, Eyewear and Sensors Integrated with Single Layer Multi-State Cholesteric Liquid Crystal Devices.

BACKGROUND

Light shutters, optical filters are commonly used in series with optical sensors to protect the sensors from be injured or jammed by light. Shutters include mechanically and electro-mechanically operated shutters. Optical filters include passive optical reflectors, passive narrow and broad band optical filters, and electro-active narrow and broad band filters. Sensors include cameras, detector arrays, and even human eyes. When the sensor is human eye, the light shutters or optical filters are commonly termed as protective eyewear.

Displays in series of prior-art switchable mirrors, and mechanically moveable mirrors are also reported. Displays include television, computer monitor, to name a few. The technologies for those prior-art switchable mirrors include Electrochromic (EC), Suspended particle devices (SPDs), Thermochromics (TC), and Reversible electrochemical mirror (REM).

Electrochromic (EC) material changes its opacity between a colored, translucent state (usually blue) and a transparent state under a burst of electricity, controlling the amount of light and heat passing through. No electricity is needed for maintaining the particular shade. Recent advances in EC materials pertaining to transition-metal hydride electrochromics have led to the development of reflective hydrides, which become reflective rather than absorbing, and thus switch states between transparent and mirror-like. For example, National Institute of Advanced Industrial Science and Technology (AIST), Japan, announced such kind film.[1] However, its IR clear state transmittance is only limited to 38%. Moreover, it attenuates visible light significantly, up to 55%. Also, it takes long time to transition from one state to another, in several minutes. A typical mirror is developed by Lawrence Berkeley National Laboratory.[2] EC based smart glazing are being developed by SAGE.

[1] http://www.aist.go.jp/aist_e/latest_research/2007/20071213/20071213.html
[2] "Sb—Cu—Li electrochromic minors", Gao Liu, Thomas J. Richardson, Solar Energy Materials & Solar Cells 86 (2005) 113-121

Suspended particle devices (SPDs)[3] consist of rod-like particles suspended in a fluid. Research Frontiers is the developer. Under zero voltage, the particles are arranged in random orientations and tend to absorb light. When voltage is applied, the particles align and let light pass. SPDs can be dimmed, and allow control of the amount of light and heat passing through. A constant electrical current is required to keep the SPD smart window in transparent stage. It limits only 51% transmittance in clear state.

[3] http://www.businesswire.com/portal/site/google/?ndmViewId=news&newsId=20090611006077&newsLang=en Thermochromics (TC) material changes color with temperature. RavenBrick[4] has developed a new TC material. It darkens in response to an increase in the temperature of the window without an electric current or human intervention. Unfortunately, its clear state transmittance is only around 40%.

[4] http://www.ravenbrick.com/

Reversible electrochemical mirror (REM),[5] as developed by Rockwell Scientific, is based on reversible electro-plating deposition of silver (Ag+/Ag). Via applying DC voltage, a layer of silver can be deposited onto the inner surface of glass substrate to form a reflective mirror to reject sunlight and heat. Under a reverse DC voltage which dissolves the silver layer, the mirror becomes transparent allowing solar heating through the window.

[5] "Efficient Adjustable Reflectivity Smart Window", Morgan Tench, http://www.govforums.org/e&w/documents/Rockwell.pdf U.S. Pat. No. 6,674,505 which is incorporated by reference in its entirety which discloses a device and method of manufacturing a single layer multi-state ultra-fast cholesteric liquid crystal (CLC) includes two optically transparent states with a liquid crystal arranged therebetween, and changing the optical states of the liquid crystal ranging from one state to any combination of broadband reflection, tunable narrow band reflection, light scattering, and transparency in accordance with a voltage applied to the device. A surfactant can be added to reduce the response time and a dichroic dye may be added to include the property of light absorption and reduce the bandwidth. The device can provide any and all of the aforementioned optical states for infrared light, visible light, and ultra-violet light. The desired outputs can be formed according to need, so that predetermined optical states can operate with either no voltage or a particular voltage or voltage range.

SUMMARY

A sensing device may include a cholesteric crystal device including two optically transparent substrates; a liquid crystal having portions adapted for producing a plurality of optical states, said liquid crystal being arranged between the two optically transparent substrates; an optical sensor for changing optical states of respective portions of said liquid crystal to produce a range of respective optical states including all optical states produced by said liquid crystal ranging from one state to any combination of broadband reflection, tunable narrow band reflection, light scattering, and transparency in accordance with an amount of voltage applied across said cholesteric crystal device for changing optical states An eyewear device may include a pair of cholesteric crystal lenses for an eyewear, each lens including two optically transparent substrates; a liquid crystal having portions adapted for producing a plurality of optical states, said liquid crystal being arranged between the two optically transparent substrates; a device for changing optical states of respective portions of said liquid crystal to produce a range of respective optical states including all optical states produced by said liquid crystal ranging from one state to any combination of broadband reflection, tunable narrow band reflection, light scattering, and transparency in accordance with an amount of voltage applied across said cholesteric crystal lens for changing optical states.

A display device may include a cholesteric crystal including two optically transparent substrates; a liquid crystal having portions adapted for producing a plurality of optical states, said liquid crystal being arranged between the two optically transparent substrates; a display for changing optical states of respective portions of said liquid crystal to produce a range of respective optical states including all optical states produced by said liquid crystal ranging from one state to any combination of broadband reflection, tunable narrow band reflection, light scattering, and transparency in accordance with an amount of voltage applied across said cholesteric crystal for changing optical states.

BRIEF DESCRIPTION OF THE DRAWINGS

The invention may be understood by reference to the following description taken in conjunction with the accompanying drawings, in which, like reference numerals identify like elements, and in which.

DETAILED DESCRIPTION

It is then an object of the present invention to provide an integrated display system that incorporates at least one device that is formed from the electrically switchable devices described in the U.S. Pat. No. 6,674,504.

It is further an object of the present invention to provide a device of protection for optical sensors with at least one device that is formed from the electrically switchable devices described in the U.S. Pat. No. 6,674,504.

It is further an object of the present invention to provide an electrically switchable mirror in front of a display such as a television, wherein the switchable mirror is formed from the electrically switchable devices described in the U.S. Pat. No. 6,674,504.

It is further an object of the present invention to provide an electrically switchable eyewear to be positioned in front of human eyes, wherein the switchable eyewear is made from the electrically switchable devices described in the U.S. Pat. No. 6,674,504.

Figure 1:
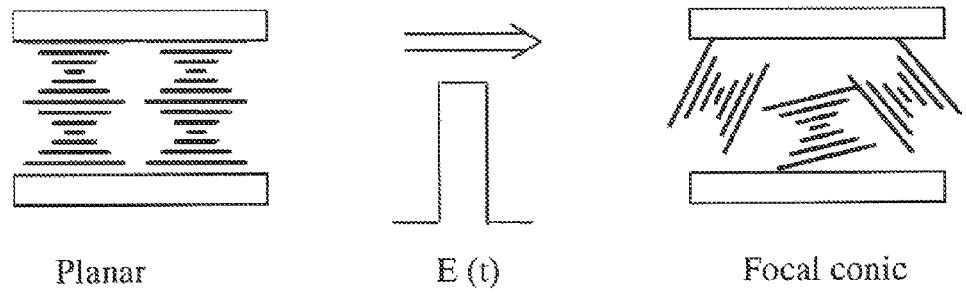
FIG. 1 illustrates triggering of a CLC in planar state to a focal conic state by an electric field.

FIG. 1 illustrates the triggering of a CLC device in planar state to a focal conic state by an electric field, the CLC device can also exhibit a focal conic state that scatters light, as shown in FIG. 1. The focal conic state can be generated via different ways. The most conventional method is to electrically trigger a CLC device already in a planar state (associated with a naturally narrow band polarizing state) into the focal conic state. In general, such a focal conic state may be unstable.

FIG. 1 illustrates the triggering of a CLC device in planar state to a focal conic state by an applied electric field.

Figure 2:
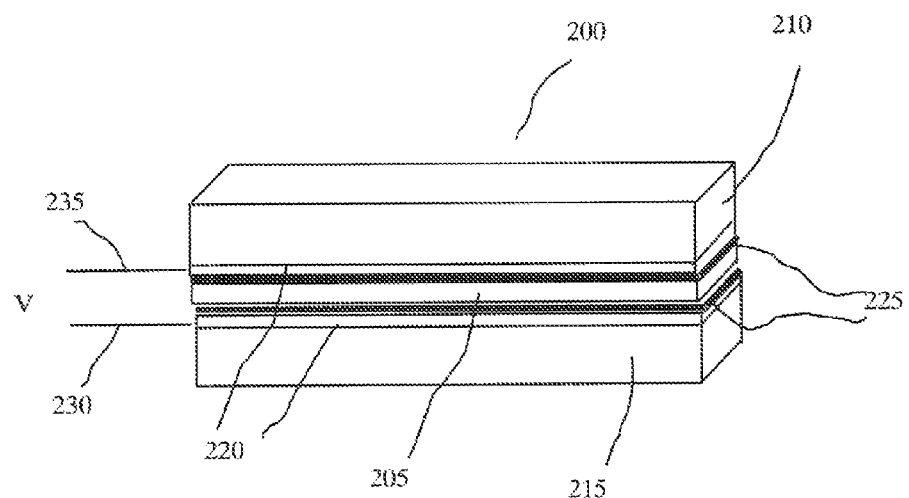
FIG. 2 is a schematic illustration of the CLC device structure of the present invention.

FIG. 2 is a schematic illustration of the CLC device (an electrically switchable device) of the present invention. FIG. 2 may be a schematic drawing of a CLC device 200 of the present invention. The first embodiment of the CLC device 200 according to the present invention may be one in which a single dichroic dye or a plurality of dyes may or may not have been introduced into the CLC. In this device, the liquid crystal 205 may be sandwiched between two optically transparent substrates 210, 215 that may have an Indium-Tin-Oxide (ITO) electrode 220 and a rubbed polyimide coating 225. The switching of the device may be realized via applying an electric voltage "V" to the two ITO electrodes 230, 235.

FIGS. 3a to 3e provide schematic illustrations of the four optical states of the CLC device of the present invention, and their associated CLC alignment texture in one of the embodiments.

FIG. 3 schematically illustrates the optical states of the embodiment of the CLC device of the present invention shown in FIG. 2 and their associated liquid crystal alignment texture.

As shown in FIG. 3($a$), the first optical state of the CLC device 300 may be aligned in a planar texture 305 with a pitch gradient under zero voltage (V=0). In this optical state, the device reflects a broad band-pass of an unpolarized incident light into a circularly polarized light whose handedness matches that of the CLC helix. 50% of the light within the bandwidth may be reflected while the rest 50% may be transmitted as an opposite polarization.

Figure 3A:
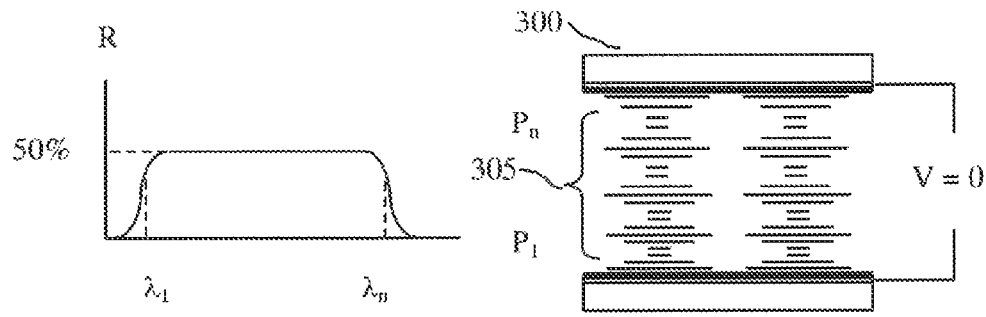
FIGS. 3a to 3e provide schematic illustrations of the four optical states of the CLC device of the present invention and their associated CLC alignment texture in one of the embodiments.
Figure 3B:
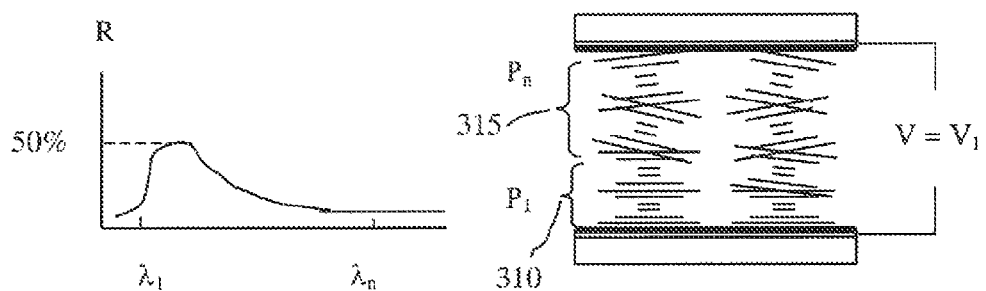

FIG. 3b illustrates the second optical state of the first embodiment when a non-zero voltage (V=$V_1$ not equal to 0) is applied. In this state, a portion of the CLC device is aligned in a planar texture 310 with a pitch gradient $P_1$, while the remaining portion of the CLC device may be switched into the focal conic state 315. In this optical state, the device exhibits a distorted broadband reflection characteristic, as shown by the adjacent graph. At the same time, a focal conic texture is presented; therefore the device becomes scattering in the visible light range. Depending on from which side the light is incident, the device results in different transmission and reflection characteristics. If the light is incident from the planar alignment texture side 310, close to 50% of the light within the distorted bandwidth is reflected. The rest of the light is transmitted and scattered. Due to the nature of light scattering, the polarization of the transmitted light is disturbed and scrambled.

However, if the light is incident from the focal conic texture side 315 of the device, first of all, the light experiences a light scattering process in both forward and backward directions. Less than 50% of the forward-scattered light within the distorted bandwidth may be reflected by the next CLC in planar texture and a first time period followed by a second time period scattering when re-passing through the focal conic layer. Therefore, the polarization state of the reflected light is disturbed and scrambled. The rest of the forward scattered light is transmitted through the planar CLC with opposite polarization to the CLC helix handedness. Actually, the transmitted light is partially depolarized because some of the light hitting the planar CLC at a large angle is difficult to be completely polarized.

Figure 3C:
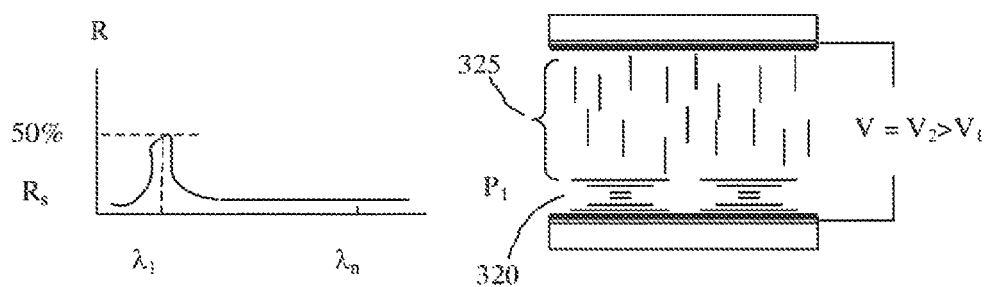

FIG. 3c illustrates the third optical state of the first embodiment when a higher voltage ($V_2$>$V_1$ not equal to 0) is applied. In this state, a portion of the CLC 320 is still aligned in a planar texture with a quasi-constant pitch. The remaining portion CLC 325 may be vertically aligned by the electric field into the homeotropic texture. In this optical state, the device may exhibit a quasi-narrow band reflection characteristic at the wavelength determined by the quasi-constant CLC pitch.

Figure 3D:
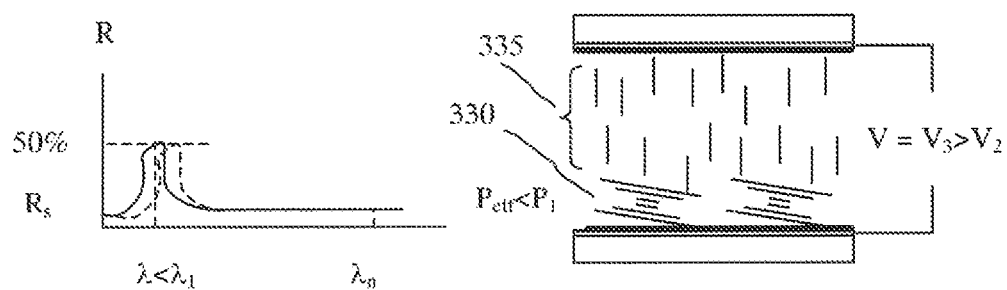

FIG. 3d illustrates the device still in the third optical state of the first embodiment but showing a wavelength shift when an even higher voltage ($V_3 > V_2$) is applied. In this state, a portion of the CLC 330 may remain in a planar texture with a quasi-constant pitch. However, this CLC pitch may be tilted by the electric field. The remaining portion of CLC 335 may be still aligned in the homeotropic texture. In this optical state, even though the device still exhibits a quasi-narrow band reflection characteristic, its wavelength has a blue shift. This particular situation implies that the reflection wavelength of the CLC device of the present invention may be electrically tuned while its bandwidth does not experience a noticeable change.

Figure 3E:
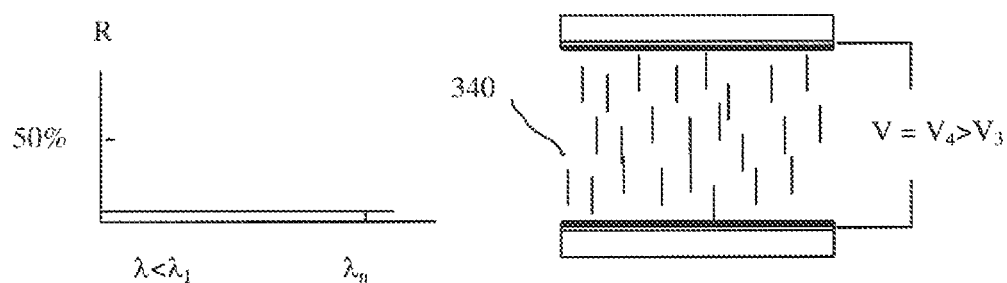

FIG. 3e illustrates the fourth optical state of the first embodiment under a very high voltage ($V_4 > V_3$). In this state, all the CLC helices 340 may be completely unwound and the entire CLC device may be vertically aligned into the homeotropic texture. Therefore, the device becomes optically transparent.

FIGS. 4a to 4d are schematic illustrations of the three optical states of the CLC device of the present invention in the second embodiment. FIGS. 4a-4d schematically illustrate the optical states of the CLC device of the present invention in the second embodiment of the present invention, and their associated liquid crystal alignment texture.

Figure 4A:
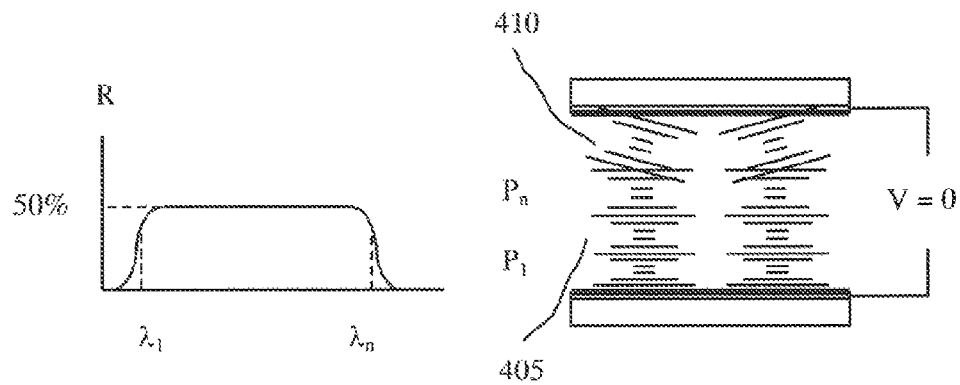
FIGS. 4a to 4d are schematic illustrations of the three optical states of the CLC device of the present invention in the second embodiment.

FIG. 4a illustrates the first optical state of the second embodiment in which a portion of the CLC device may be aligned in a planar texture with a pitch gradient under a zero voltage (V=0). The remaining portion CLC may be in the focal conic texture 410. In this optical state, the device exhibits a mixed optical state of reflection and scattering, which is similar to the optical texture in FIG. 3b.

Figure 4B:
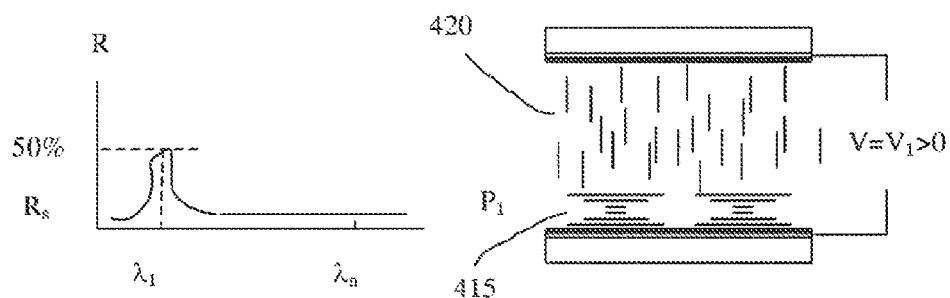

FIG. 4b illustrates the second optical state of the second embodiment when a non-zero voltage ($V_1$ not equal to 0) is applied. In this state, a portion of the CLC 415 is aligned in a planar texture with a quasi-constant pitch while the remaining portion CLC 420 may be aligned into the homeotropic texture. In this optical state, the device may exhibit a quasi-narrow band reflection characteristic at the wavelength determined by the quasi-constant CLC pitch.

Figure 4C:
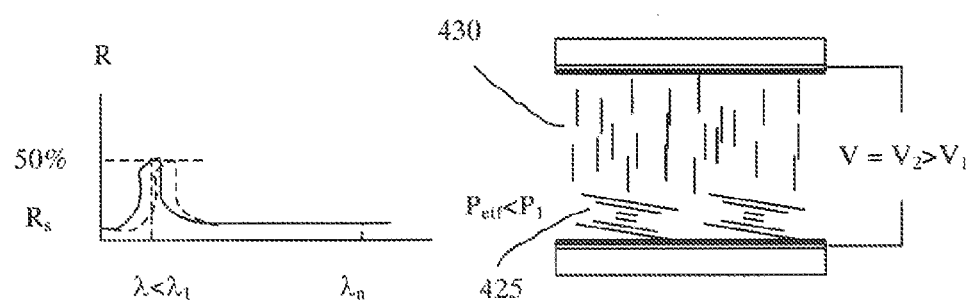

FIG. 4c illustrates the narrow band reflection but at a shifted wavelength when a higher voltage ($V_2 > V_1$) is applied. In this state, a portion of the CLC 425 may remain in the planar texture with a quasi-constant pitch. However, this CLC pitch may be tilted by the electric field. The remaining portion of CLC 430 may be still aligned in the homeotropic texture. The reflection wavelength of the invented CLC device is electrically tuned while its bandwidth does not experience a noticeable change.

Figure 4D:
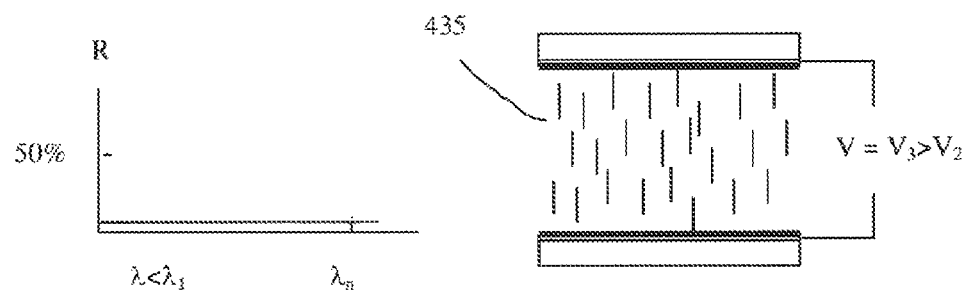

FIG. 4d illustrates the third optical state of the second embodiment under a very high voltage (V.sub.3>V.sub.2). In this state, all the CLC helices 435 are completely unwound and the whole CLC is aligned in the homeotropic texture. The device becomes optically transparent.

In the first embodiment of this invention disclosure, using the electrically switchable devices claimed in the U.S. Pat. No. 6,674,504 for sensor protection is disclosed.

Figure 5A:
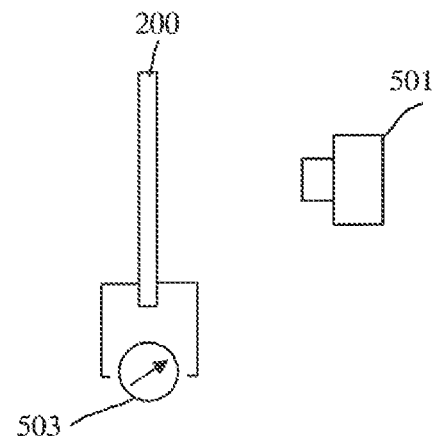
FIG. 5A illustrates the CLC device with an optical sensor.

FIG. 5A schematically shows CLC device 200 being positioned in front of an optical sensor 501 and being controlled by the electrical power device 503. In the normal sensing mode, the CLC device 200 is switched into transparent state by applying the appropriate voltage from the electrical power device 503. When light attenuation is required for the optical sensor 501, the CLC device 200 is switched into a state with high opacity by applying the appropriate voltage from the electrical power device 503.

In an alternative embodiment for sensor protection, two CLC devices 200 may be vertically stacked and positioned in front of an optical sensor 501 and may be controlled by the electrical power device 503. The first CLC device has a CLC material that has a first predetermined helix handedness while the second CLC device may have a second CLC material that may have an opposite helix handedness to that of the first CLC device. Each CLC device 200 may be individually controlled by separate electrical power devices 503. In the sensing mode when maximum light transmittance is desired, both CLC devices 200 may be switched into transparent state by applying the appropriate voltage from the controlling electrical power device 503. When the near highest light attenuation is required for the optical sensor 501, both CLC devices 200 are switched into a state with high opacity by applying the appropriate voltage from the controlling electrical power device 503. Assume the first CLC device has a left-handedness helix while the second CLC has a right-handedness helix. 50% of an unpolarized incoming light may be reflected by the first CLC device into left-handed circular polarization state while the remaining 50% of the unpolarized incoming light may be transmitted into right-handed circular polarization state. The transmitted right-handed circular polarization light may be further reflected by the second CLC device. As a result, near zero percent of light will be transmitted (at least in theory). When an intermediate light attenuation may be required for the optical sensor 501, one of the two CLC devices 200 may be switched into transparent state by applying the appropriate voltage from the controlling electrical power device 503 while the second CLC device may be switched into a state with high opacity by applying another appropriate voltage from the controlling electrical power device 503.

Figure 5B:
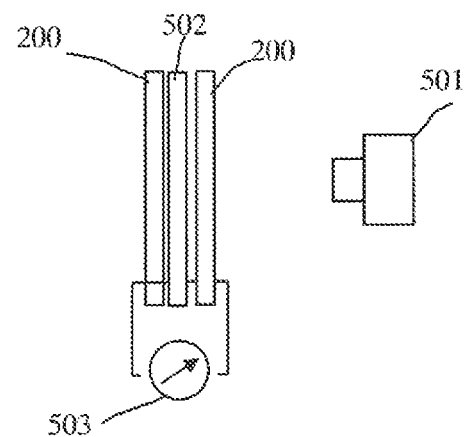
FIG. 5B illustrates the CLC device with an additional optical phase retarder and optical sensor

Further, established on the above described arrangement for sensor protection, there is an alternative arrangement in which an electrically switchable optical phase retarder 502 may be placed in between of the two stacked CLC devices 200 that may be positioned in front of an optical sensor 501 and may be controlled by the electrical power device 503, as shown in FIG. 5B. The two CLC devices may have the same or opposite handedness helix. The electrically switchable optical phase retarder 502 may have an optical retardance that may be electrically controlled. The retarder 502 may be formed from electro-optically active material such as nematic liquid crystal material. [6] Each CLC device 200 and the electrically switchable optical phase retarder 502 may be individually controlled by separate electrical power devices 503. Assume the two CLC devices may have the opposite handedness. In the normal sensing mode when maximum light transmittance is desired, both CLC devices 200 may be switched into transparent state by applying the appropriate voltage from the controlling electrical power device 503. When the highest light attenuation may be required for the optical sensor 501, both CLC devices 200 may be switched into a state with high opacity while the electrically switchable optical phase retarder 502 may be switched to have a zero (0) phase retardance by applying the appropriate voltage from the electrical power device 503. Therefore, an incoming arbitrarily polarized light may be totally reflected by the two stacked CLC devices 200. When an intermediate light attenuation is required for the optical sensor 501, the electrically switchable optical phase retarder 502 may be switched to have a non-zero retardance while the two CLC devices may be still in the high opacity state. For an unpolarized incoming light, the transmitted right-handed circular polarization from the first CLC device with left-handedness helix is converted to elliptical polarization state after passing through the electrically switchable optical phase retarder 502 and the part of the elliptical polarization is reflected by the second CLC device with right-handedness helix, and the rest of the light is transmitted.

[6]"The Physics of Liquid Crystals", second edition, P. G. De Gennes and J. Prost, Oxford, 1993.

Figure 6A:
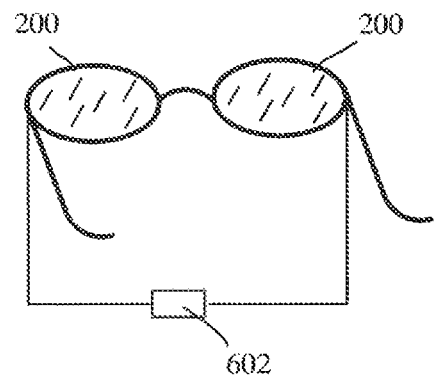
FIG. 6A illustrates the CLC device mounted in eyeglasses.

FIG. 6A shows CLC device 200 being used as lenses in a pair of eyewear to be used to protect human eyes. The CLC device 200 may be controlled by the electrical power device 602 by applying an electrical voltage to the CLC device 200. Each CLC device 200 which acts as lenses for the eyewear may be individually controlled by separate electrical power devices 602. The eyewear may be goggles, spectacles, and visors, or other such eyewear. In low lighting environment, the CLC device 200 of the eyewear may be switched into a state with high transmission. In bright light environment, the CLC device 200 of the eyewear may be switched into a high opacity state.

Figure 6B:
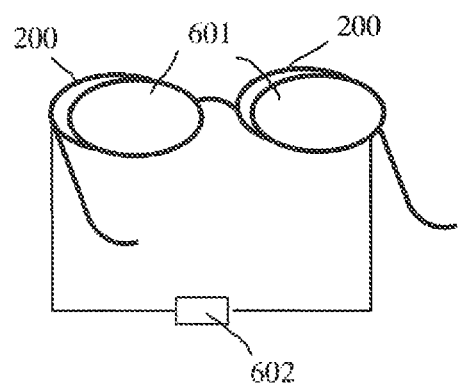
FIG. 6B illustrates the CLC device with an additional electrically switchable optical absorber mounted in eyeglasses;
6C illustrates the side view of the CLC device with an additional electrically switchable optical absorber mounted in eyeglasses.
Figure 6C:
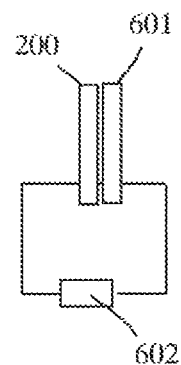

Further, as shown in FIG. 6B, the above described arrangement for eyewear, there may be an alternative arrangement in which an electrically switchable optical absorber 601 is added in adjacent to each CLC device 200. The electrically switchable optical absorber 601 may have an optical attenuation that is electrically controlled. The absorber 601 may be formed from electro-optically active material such as nematic liquid crystal material doped with a dichroic dye or dyes. In this dichroic dye doped nematic liquid crystal based switchable optical absorber, both the liquid crystal and dye molecules may have elongated shape. The longer axis of the dye may absorb more light than its shorter axis. When the longer axis of both liquid crystal and dye is along, i.e., in parallel to, the light propagation direction, the absorber exhibits the minimum light attenuation. When the longer axis of both liquid crystal and dye is perpendicular to the light propagation direction, the absorber may exhibit heavier light attenuation. The longer axis of the dye and liquid crystal may also be controlled neither parallel nor perpendicular to the light propagation direction by supplying an appropriate voltage from an electrical power device. In this situation, intermediate light absorption may be obtained. The orientation of the longer axis of the liquid crystal and the dye may be controlled by changing the voltage amplitude across the absorber which may be further provided by the electrical power devices 602. Both CLC device 200 and the electrically switchable optical absorber 601 may be individually controlled by separate electrical power devices 602.

In one mode when maximum light transmittance is desired, both CLC device 200 and the electrically switchable optical absorber 601 may be switched into transparent state by applying the appropriate voltage from the controlling electrical power device 602. When the near highest light attenuation is required, both CLC device 200 and the electrically switchable optical absorber 601 may be switched into a state with high opacity by applying the appropriate voltage from the electrical power device 602. Therefore, an incoming arbitrarily polarized light may be first partially reflected by the CLC device 200 and further absorbed by the electrically switchable optical absorber 601. When an intermediate light attenuation may be required, as an example, the electrically switchable optical absorber 601 may be switched to have an intermediate light absorbance while the CLC device may be controlled to be in either in transparent or high opacity state.

Figure 7:
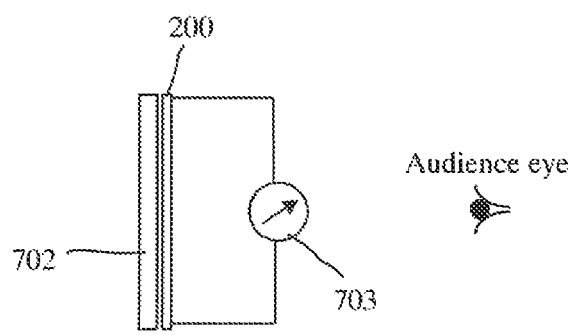
FIG. 7 illustrates the CLC device with a display.

The CLC device 200 may be used in conjunction with a display 702. FIG. 7 schematically shows the CLC device 200 performing an integrated display with the CLC device 200 positioned in front of display 702. When the display 702 is off, the CLC device 200 is switched in mirror state by an electrical power device 703 such that the entire integrated display looks like a mirror. When the display 702 is turned on, the CLC device 200 may be turned on to transparent state by an electrical power device 703, allowing audiences to watch the information or show from the display 702.

In an alternative arrangement, two CLC devices 200 may be vertically stacked and positioned in front of display 702 and being controlled by the electrical power device 703. The first CLC device may have a CLC material that has a predetermined helix handedness while the second CLC device may have another CLC material that has an opposite helix handedness. Each CLC device 200 may be individually controlled by separate electrical power devices 703.

When the display 702 is off, both CLC devices 200 may be switched in mirror state by an controlling electrical power device 703 such that the entire integrated display looks like a mirror. When the display 702 is turned on, both CLC device 200 may be turned on to transparent state by an electrical controlling power device 703, allowing audiences or users to watch the information or show from the display 702.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A sensing device comprising:
at least a first cholesteric crystal device including a first two optically transparent substrates, and a first liquid crystal having portions adapted for producing a plurality of optical states, said first liquid crystal being arranged between the first two optically transparent substrates;
at least a second cholesteric crystal device including a second two optically transparent substrates, and a second liquid crystal having portions adapted for producing a plurality of optical states, said liquid crystal being arranged between said second two optically transparent substrates, wherein said at least second cholesteric crystal device has an opposite handedness helix to that of said at least first cholesteric crystal device;
an optical sensor wherein said cholesteric crystal devices are stacked and positioned in front of said optical sensor; and
at least one electrical power device to individually control each of said cholesteric crystal devices for changing optical states of respective portions of said liquid crystals to produce a range of respective optical states including all optical states produced by said liquid crystals ranging from one state to any combination of broadband reflection, tunable narrow band reflection, light scattering, and transparency in accordance with an amount of voltage applied across said cholesteric crystal devices for changing optical states,
wherein when maximum light transmittance is desired said crystal devices are switchable into a transparent state, and when light attenuation is desired said crystal devices are switchable into a high opacity state, and when intermediate light attenuation is desired one of said crystal devices is switchable into a transparent state and another of said crystal devices is switchable into a high opacity state.

2. The at least first cholesteric crystal device in the sensing device in claim 1 further comprising: at least a dichroic dye.

3. The at least second cholesteric crystal device in the sensing device in claim 1 further comprising: at least a dichroic dye.

4. The sensing device in claim 1 further comprising: at least a first electrically switchable optical absorber.

5. The said at least first electrically switchable optical absorber in claim 4 further comprising: at least a dichroic dye doped in the at least a first liquid crystal.

6. A sensing device comprising:
at least a first cholesteric crystal device including a first two optically transparent substrates, and a first liquid crystal having portions adapted for producing a plurality of optical states, said first liquid crystal being arranged between said first two optically transparent substrates;
at least a second cholesteric crystal device including a second two optically transparent substrates, and a second liquid crystal having portions adapted for producing a plurality of optical states, said liquid crystal being arranged between said second two optically transparent substrates, wherein said at least second cholesteric crystal device has an opposite handedness helix to that of said at least first cholesteric crystal device;
an optical sensor wherein said cholesteric crystal devices are stacked and positioned in front of said optical sensor;
at least an electrically switchable optical phase retarder; said electrically switchable optical phase retarder is placed in between the at least first and second cholesteric crystal devices; and
at least one electrical power device to individually control said phase retarder, and each of said cholesteric crystal devices for changing optical states of respective portions of said liquid crystals to produce a range of respective optical states including all optical states produced by said liquid crystals ranging from one state to any combination of broadband reflection, tunable narrow band reflection, light scattering, and transparency in accordance with an amount of voltage applied across said cholesteric crystal devices for changing optical states;
wherein when maximum light transmittance is desired said crystal devices are switchable into a transparent state, when light attenuation is desired said crystal devices are switchable into a high opacity state while said phase retarder is switchable to have a zero phase retardance to reflect incoming arbitrarily polarized light, and when intermediate light attenuation is desired said phase retarder is switchable to have a non-zero phase retardance while said crystal devices are in said high opacity state, such that for unpolarized incoming light a transmitted right-handed circular polarization from said crystal device with left-handedness helix is converted to elliptical polarization state after passing through said phase retarder and part of the elliptical polarization is reflected by said crystal device with right-handedness helix while the rest of the light is transmitted.

7. The at least an electrically switchable optical phase retarder in the sensing device in claim 6 further comprising: At least a nematic liquid crystal.

8. An eyewear device comprising:
at least a pair of cholesteric crystal lenses for an eyewear, each lens further comprising at least a cholesteric crystal device including two optically transparent substrates, and; a liquid crystal having portions adapted for producing a plurality of optical states, said liquid crystal being arranged between the two optically transparent substrates;
electrically switchable optical absorbers including at least a dichroic dye doped in said liquid crystals of said crystal devices; and
an electrical power device to control said at least a cholesteric crystal device for changing optical states of respective portions of said liquid crystal to produce a range of respective optical states including all optical states produced by said liquid crystal ranging from one state to any combination of broadband reflection, tunable narrow band reflection, light scattering, and transparency in accordance with an amount of voltage applied across said cholesteric crystal lens for changing optical states;
wherein when light transmittance is desired said crystal devices and said optical absorbers are switchable into a transparent state, and when light attenuation is desired said crystal devices and said optical absorbers are switchable into a high opacity state for reflection of incoming arbitrarily polarized light by said crystal devices and absorption by said optical absorber.

9. An eyewear device comprising:
at least a first pair of cholesteric crystal lenses, each lens further comprising at least a first cholesteric crystal device including a first two optically transparent substrates, and a first liquid crystal having portions adapted for producing a plurality of optical states, said first liquid crystal being arranged between the first two optically transparent substrates;
at least a second pair of cholesteric crystal lenses, each lens further comprising at least a second cholesteric crystal device including a second two optically transparent substrates, and a second liquid crystal having portions adapted for producing a plurality of optical states, said second liquid crystal being arranged between the second two optically transparent substrates, wherein the at least second pair of cholesteric crystal lenses have a helix handedness that is opposite to that of the at least first pair of cholesteric crystal lenses;
electrically switchable optical absorbers adjacent to each of said crystal devices; and
an electrical power device to individually control said optical absorbers, and said at least first and second cholesteric crystal devices for changing optical states of respective portions of said liquid crystals to produce a range of respective optical states including all optical states produced by said liquid crystals ranging from one state to any combination of broadband reflection, tunable narrow band reflection, light scattering, and transparency in accordance with an amount of voltage applied across said cholesteric crystal lens for changing optical states;
wherein when light transmittance is desired said crystal devices and said optical absorbers are switchable into a transparent state, when light attenuation is desired said crystal devices and said optical absorbers are switchable into a high opacity state for reflection of incoming arbitrarily polarized light by said crystal devices and absorption by said optical absorber, and when intermediate light attenuation is desired said optical absorber is switchable to have intermediate light absorbance while said crystal devices are controllable in either the transparent and/or high opacity states.

10. The eyewear device in claim 8 further comprising: at least an electrically switchable optical phase retarder; the said electrically switchable optical phase retarder is placed in between of the at least first and second cholesteric crystal devices.

11. A display device comprising:
at least a cholesteric crystal device including two optically transparent substrates, and a liquid crystal having portions adapted for producing a plurality of optical states, said liquid crystal being arranged between the two optically transparent substrates;
a display wherein said crystal device is positioned in front of said display; and
an electrical power device to control said cholesteric crystal device for changing optical states of respective portions of said liquid crystal to produce a range of respective optical states including all optical states produced by said liquid crystal ranging from one state to any combination of broadband reflection, tunable narrow band reflection, light scattering, and transparency in accordance with an amount of voltage applied across said cholesteric crystal for changing optical states;
wherein when said display is off, said crystal device is switchable to a mirror state such that the display device looks like a mirror, but when said display is turned on, said crystal device is switchable to a transparent state to allow users to watch said display.

12. The display device in claim 11 further comprising:
at least a second cholesteric crystal including a second two optically transparent substrates, and a second liquid crystal having portions adapted for producing a plurality of optical states, said liquid crystal being arranged between the second two optically transparent substrates, wherein the said at least second cholesteric crystal device has an opposite handedness helix to that of the at least first cholesteric crystal device,
wherein when said display is off said crystal devices are switchable to a mirror state such that the display device looks like a mirror, but when said display is turned on said crystal devices are switchable to a transparent state allowing users watch said display.

* * * * *